United States Patent [19]  
Erickson et al.

[11] 4,053,702  
[45] Oct. 11, 1977

[54] DIELECTRIC STRESS RELIEF AT A HIGH VOLTAGE CABLE TERMINATION

[75] Inventors: Roy D. Erickson; Leonard A. Johnson, both of Woodbury; Edward I. Porwit, St. Paul, all of Minn.

[73] Assignee: Minnesota Mining and Manufacturing Company, St. Paul, Minn.

[21] Appl. No.: 595,503

[22] Filed: July 14, 1975

[51] Int. Cl.² ........................................ H02G 15/08
[52] U.S. Cl. .............................................. 174/73 R
[58] Field of Search ......................... 174/73 R, 73 SC

[56] References Cited

U.S. PATENT DOCUMENTS

| | | | |
|---|---|---|---|
| 3,558,799 | 1/1971 | Lee | 174/73 R |
| 3,585,274 | 6/1971 | Tomaszewski et al. | 174/73 R |
| 3,691,291 | 9/1972 | Taj | 174/73 R |
| 3,692,922 | 9/1972 | Sugimoto et al. | 174/73 R |
| 3,725,846 | 4/1973 | Strain | 174/73 R UX |
| 3,816,640 | 6/1974 | Varner | 174/73 R |
| 3,992,567 | 11/1976 | Malia | 174/73 R |

Primary Examiner—Laramie E. Askin  
Attorney, Agent, or Firm—Cruzan Alexander; Donald M. Sell; Robert E. Granrud

[57] ABSTRACT

A means for relieving dielectric stress at a termination of a shielded and insulated high voltage cable. A smooth geometry high permittivity homogeneous material tube coaxially contacts both the ground electrode and the high voltage electrode. The tube consists of an elastomeric material having a permittivity in a range of from 10 to 25. The elastomeric material is non-rigid, thereby enabling the tube to be more readily fitted firmly around the cable and into the housing of the stress relief means. The ground electrode is the outer portion of the housing and diverges from the opening of the housing at the vicinity thereof in a direction toward the high voltage electrode. This dielectric stress relief means provides a satisfactory electric field gradient in applications wherein the rating is in a range from 15 kilovolts to 35 kilovolts.

3 Claims, 1 Drawing Figure

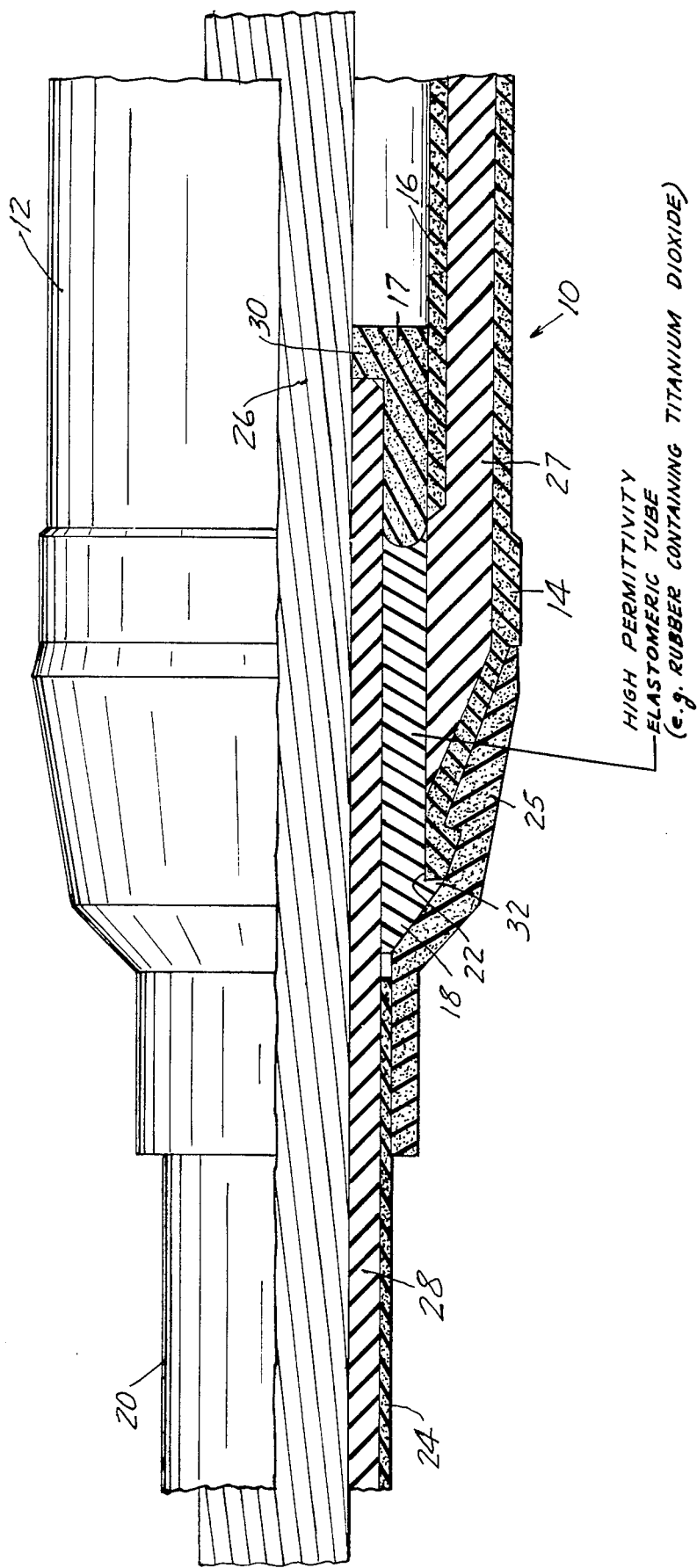

DIELECTRIC STRESS RELIEF AT A HIGH VOLTAGE CABLE TERMINATION

BACKGROUND OF THE INVENTION

1. Field of the Invention

The present invention generally relates to the relief of dielectric stress at high voltage terminations and is particularly directed to the type of high voltage cable termination wherein a shielded high voltage cable is terminated with the shielding of the cable conductively coupled to the ground electrode.

The term "termination" as used herein includes not only those applications wherein a cable is terminated at a source or at a load but also those applications wherein a cable is spliced to another cable. The term "ground electrode" as used herein means an electrode to which the cable shielding is conductively coupled, whether or not such electrode is adapted for contact with an earth ground.

2. Discussion of the Prior Art

A number of prior art means for providing relief of dielectric stress at high voltage cable terminations have been proposed in U.S. Pat. No. 3,349,164 to Wyatt; U.S. Pat. No. 2,745,897 to Nicholas; Great Britain patent specification No. 1,129,887; U.S. Pat. No. 3,585,274 to Tomaszewski and Wyatt; and in the patents therein noted. These prior art means generally have been directed to controlling dielectric stress by more evenly distributing the gradient of the electric field in the insulation of the high voltage cable at the location of the ground electrode.

The means described in U.S. Pat. No. 3,585,274 are very effective in more evenly distributing the electric field gradient. According to the teaching therein, stress relief is provided by a tube of a high permittivity (specific inductive capacity) material having a relatively smooth geometry. The tube is positioned in a housing for surrounding an insulated high voltage cable with one end of the tube in coaxial contact with a ground electrode, which electrode is itself positioned for conductive coupling to the shielding of the high voltage cable. For the embodiment described therein (see FIG. 4 of the patent), wherein only the ground electrode is coaxially contacted by the tube, it is stated that the permittivity of the tube is about at least five to 10 times the permittivity of the insulation of the high voltage cable. This minimum is dependent upon the thickness of the tube and the voltage rating of the device to which the high voltage cable is to be connected. Such an embodiment rated at about 35 Kilovolts or less is said to operate with a tube permittivity of about 15, although a tube permittivity of at least 30 is preferred.

In another embodiment also described in U.S. pat. No. 3,585,274, (see FIG. 3 of the patent) the tube makes coaxial contact with both the ground electrode and a high voltage electrode which is positioned for contacting the conductor of the high voltage cable. For this embodiment, which is said to be preferable for applications rated at 15 kilovolts or higher, it is stated that the permittivity of the tube is about at least 50 to 100 times the permittivity of the insulation of the high voltage cable, and that while this embodiment is operable with a tube permittivity of about 50, a tube permittivity of at least 200 is preferred.

The tube used in the embodiments described in U.S. Pat. No. 3,585,274 is a ceramic material including one or more titanates and/or titanium dioxide. Although such a tube is considerably more expensive than the elastomeric materials commonly used for providing dielectric stress relief in other prior art devices, it does provide the high permittivity of at least 50 that is desired for the latter above described embodiment, which high permittivity has not been attainable with elastomeric materials.

SUMMARY OF THE INVENTION

A means for relieving dielectric stress at a termination of a shielded and insulated high voltage cable, in which stress relief is provided by a smooth geometry high permittivity homogeneous material tube that coaxially contacts both the ground electrode and the high voltage electrode, is characterized by the tube consisting of an elastomeric material having a permittivity in a range of from 10 to 25. The elastomeric material is non-rigid, thereby enabling the tube to be more readily fitted firmly around the cable and into the housing of the stress relief means.

The means for relieving dielectric stress according to the present invention is further characterized by the ground electrode being the outer surface of the housing and diverging from the opening of the housing at the vicinity thereof in a direction toward the high voltage electrode. This feature provides additional stress relief and enhances the uniformity of the electric field gradient provided by the high permittivity tube. Such means provides a satisfactory electric field gradient in applications wherein the rating is in a range from 15 kilovolts to 35 kilovolts. The present invention thus provides a dielectric stress relief means which may be used in lieu of the embodiment of FIG. 3 of U.S. Pat. No. 3,585,274 for such rated applications. The present invention likewise provides a relatively simple construction, but does not require the expensive high permittivity ceramic tube described for use in such embodiment.

In a preferred embodiment of the present invention, ease of assembly is enhanced by the feature of the opening of the housing being adapted for receiving a high voltage cable having the high permittivity tube attached thereto. In such embodiment the tube has an outward extending ridge that exceeds the diameter of the mouth of the opening to limit relative insertion of the tube into the opening. Integral with the end of the tube opposite the ridge is a conductive nonrigid elastomeric tubular extension. Such conductive extension forms a part of the high voltage electrode when the tube is received in the opening. Such conductive extension has an inwardly extending lip that is adapted for contacting an exposed portion of the conductor of the high voltage cable and at least a portion of the cable insulation adjacent such exposed portion of the high voltage conductor. The outward extending ridge and the inward extending lip respectively position the tube with respect to the housing and the high voltage cable as the stress means is assembled by simply pushing the cable and housing in opposite directions. In this embodiment an end cap conductively couples the shielding of the cable to the ground electrode. Ease of assembly is further enhanced by the tube and the housing all being non-rigid elastomeric materials.

BRIEF DESCRIPTION OF THE DRAWING

The single FIGURE of the Drawing shows a half-sectional view of a preferred embodiment of means of relieving dielectric stress at the termination of a high voltage cable.

DESCRIPTION OF THE PREFERRED EMBODIMENT

Referring to the FIGURE of the Drawing a preferred embodiment of the dielectric stress relief means 10, includes a housing 12 comprising a ground electrode 14, a layer of insulation 27 and one part 16 of a two part high voltage electrode 16 and 17. A high permittivity tube 18 has a conductive tubular extension 17 that forms the second part of the high voltage electrode 16 and 17. A shielded and insulated high voltage cable 20 is received in an opening 22 of the housing 12. The ground electrode 14 is the outer portion of the housing 12. The ground electrode 14 is conductively coupled to the shielding 24 of the high voltage cable 20 by a conductive end cap 25. One part of the high voltage electrode 16 is separated from the ground electrode 14 by the layer of insulation 27. The other part of the high voltage electrode 17 contacts the first part 16 and coaxially contacts the conductor 26 of the high voltage cable 20. The high permittivity tube 18 surrounds an exposed portion of the insulation 28 of the cable 20. One end of the tube 18 coaxially contacts the ground electrode 14 and the other end coaxially contacts the second part of the high voltage electrode 17.

All of the components of the stress relief means, the tube 18, the electrodes 14, 16, 17 the layer of insulation 27 and the end cap 25, are molded non-rigid elastomeric materials. The electrodes and the end cap are conductive rubber.

The tube 18 consists of a homogeneous elastomeric rubber having finely ground titanium dioxide uniformly dispersed therein. It has a permittivity in a range of from 10 to 25 and a relatively smooth geometry. The tube 18 is molded in a cylindrical shape and is of integral construction with the second part of the high voltage electrode 17.

The insulation 27 is ethylene propylene rubber having a permittivity of about 2.5.

The angle at which the ground electrode 14 diverges from the opening 22 of the housing 12 with respect to its central axis preferably is about 25° to 27°, with a tolerance of plus or minus 10° being allowed, depending upon the value of the tube permittivity. When the permittivity is near the high end of its range, a greater tolerance in the angle of divergence may be permitted. The tube 18 preferably has a thickness of 0.25 inch plus or minus 0.05 inch.

A high voltage cable 20 may be readily received within the foregoing described preferred embodiment of the dielectric stress relief means 10 in the following manner. First the end cap 25 is fitted over the end of the cable 20 to engage the shielding 24 and is pushed back beyond its final desired position which position is shown in the Drawing. Then the integral construction of the high permittivity tube 18 and the second part of the high voltage electrode 17 are fitted over the exposed insulation 28 of the cable 20 until the lip 30 of the electrode 17 that contacts the cable conductor 26 is stopped against the cable insulation 28. The cable 20 having the tube 18 and the second part of the high voltage electrode 17 attached thereto are then inserted into the housing 12 until stopped by the ground electrode 14 making coaxial contact with the ridge 32 of the tube 18. The end cap 25 is then slid forward until it firmly conductively couples the cable shielding 24 to the ground electrode 14.

When used at a cable splice, the dielectric stress relief means of the present invention may be provided at either one or both ends of the splice.

What is claimed is:

1. Means for relieving dielectric stress at a termination of a shielded and insulated high voltage cable including a housing that defines an opening for receiving a said high voltage cable, which housing comprises a layer of insulative material having a generally cylindrical shape, a conductive high voltage electrode at the inner surface of the housing for making contact with the conductor of a said high voltage cable, and a conductive ground electrode at the outer surface of the housing for conductive coupling to the shielding of said high voltage cable, said ground electrode defining the mouth of the opening in the housing and diverging from the opening; and a tube of homogeneous insulative material having a relatively smooth geometry, being adapted for surrounding an exposed portion of the insulation of a said high voltage cable, and being adapted for positioning in the opening of the housing while surrounding said exposed portion with one end of the tube coaxially contacting the ground electrode at the mouth of the opening and the other end of the tube coaxially contacting the high voltage electrode; said housing characterized by the mouth of the opening being substantially the same diameter as the remainder of the opening; and said tube characterized by consisting of a nonrigid elastomeric material having a permittivity in a range from 10 to 25, characterized by having an outward extending ridge on one end that exceeds the diameter of the mouth of the opening to limit the relative insertion of the tube into the opening, and a conductive nonrigid elastomeric tubular extension integral with the other end of the tube for forming a part of said high voltage electrode, said conductive extension having a lip extending inwardly for contacting an exposed portion of the high voltage conductor of a said high voltage cable and at least a portion of the insulation adjacent said exposed portion of the high voltage conductor of a said high voltage cable.

2. Means for relieving dielectric stress according to claim 1, further including a conductive end cap for conductively coupling the shielding of a said high voltage cable to the ground electrode of said housing.

3. Means for relieving dielectric stress according to claim 1, wherein said ground electrode diverges from said opening at an angle of between 25° and 27°.

* * * * *